(12) United States Patent
Li

(10) Patent No.: US 11,052,475 B2
(45) Date of Patent: Jul. 6, 2021

(54) RAPID REPLACING STRUCTURE FOR MULTI-PURPOSE SAW

(71) Applicant: Zhejiang Burley Tools Co., Ltd., Jinhua (CN)

(72) Inventor: Tingjin Li, Yongkang (CN)

(73) Assignee: Zhejiang Burley Tools Co., Ltd., Jinhua (CN)

( * ) Notice: Subject to any disclaimer, the term of this patent is extended or adjusted under 35 U.S.C. 154(b) by 0 days.

(21) Appl. No.: 16/201,920

(22) Filed: Nov. 27, 2018

(65) Prior Publication Data

US 2020/0164450 A1 May 28, 2020

(51) Int. Cl.
*B23D 51/10* (2006.01)
*B23D 61/00* (2006.01)

(52) U.S. Cl.
CPC ........... *B23D 51/10* (2013.01); *B23D 61/006* (2013.01)

(58) Field of Classification Search
CPC ........ B23D 51/10; B23D 61/006; B27B 5/32; B27B 19/006
USPC ............. 83/698.3, 698.31; 30/337–339, 392; 451/342–359
See application file for complete search history.

(56) References Cited

U.S. PATENT DOCUMENTS

| | | | | |
|---|---|---|---|---|
| 5,157,873 A * | 10/1992 | Rudolf | .................. | B24B 23/022 279/904 |
| 5,601,483 A * | 2/1997 | Rudolf | .................. | B24B 23/022 451/342 |
| 6,569,001 B2 * | 5/2003 | Rudolf | .................... | B24B 23/02 451/344 |
| 6,953,197 B2 * | 10/2005 | Hartmann | ................. | B27B 5/32 279/141 |
| 7,493,698 B2 * | 2/2009 | Lee | ......................... | B23D 51/10 279/79 |
| 8,187,058 B2 * | 5/2012 | Blickle | ................. | B24B 45/006 451/342 |
| 8,272,135 B2 * | 9/2012 | Zhou | ....................... | B23D 51/10 279/75 |
| 8,317,574 B2 * | 11/2012 | Blickle | .................. | B24B 23/02 294/94 |
| 8,387,717 B2 * | 3/2013 | Kildevaeld | ............ | B23D 51/10 173/1 |
| 9,050,663 B2 * | 6/2015 | Zhou | ................... | B23B 31/4073 |
| 9,067,293 B2 * | 6/2015 | Bernardi | ............... | B24B 23/022 |

(Continued)

*Primary Examiner* — Ghassem Alie
(74) *Attorney, Agent, or Firm* — Dragon Sun Law Firm, PC; Jinggao Li, Esq.

(57) ABSTRACT

A rapid replacing structure for multi-purpose saw includes an operating mechanism, a clamping mechanism and a collet. The collet is released or clamped by driving the clamping mechanism through the operating mechanism. The structure includes an output shaft having top and bottom openings and defining a chamber. The collet is mounted in the chamber. The clamping mechanism includes a spring, a collet sleeve, and a compressor arm. The collet sleeve is disposed around and movable along an upper portion of the collet. One end of the spring contacts with the bottom wall of the output shaft, while another end contacts with the collet sleeve. The compressor arm includes a top lever, and a top ring integrally formed on a lower end of the top lever and located above the collet sleeve. The top lever of the compressor arm is connected in a contacted manner to the operating mechanism.

5 Claims, 3 Drawing Sheets

(56) References Cited

U.S. PATENT DOCUMENTS

| | | | | |
|---|---|---|---|---|
| 9,463,547 | B2* | 10/2016 | Fankhauser | B24B 23/04 |
| 9,539,682 | B2* | 1/2017 | Kawakami | B23Q 3/14 |
| 9,545,699 | B2* | 1/2017 | Furusawa | B25F 3/00 |
| 9,669,536 | B2* | 6/2017 | Ito | B25F 5/02 |
| 9,821,430 | B2* | 11/2017 | Zhang | B24B 23/04 |
| 10,131,032 | B2* | 11/2018 | Gao | B27B 19/006 |
| 10,471,518 | B2* | 11/2019 | Klabunde | B24B 45/006 |
| 2013/0180747 | A1* | 7/2013 | Brown | B25F 5/00 173/145 |
| 2013/0270780 | A1* | 10/2013 | Erni | B23Q 3/12 279/141 |
| 2014/0183828 | A1* | 7/2014 | Xu | B27B 19/006 279/141 |
| 2017/0259348 | A1* | 9/2017 | Scott | B23B 31/19 |
| 2017/0340338 | A1* | 11/2017 | Hassler, Jr. | A61B 17/15 |
| 2018/0243894 | A1* | 8/2018 | Wang | F16H 21/40 |
| 2018/0283508 | A1* | 10/2018 | Aoki | B25F 5/02 |
| 2019/0120347 | A1* | 4/2019 | Bek | B25F 3/00 |
| 2019/0168371 | A1* | 6/2019 | Aoki | B23D 51/01 |
| 2019/0299299 | A1* | 10/2019 | Motschi | B23B 31/1177 |

* cited by examiner

RAPID REPLACING STRUCTURE FOR MULTI-PURPOSE SAW

FIELD OF INVENTION

The present invention involves the field of invention of electric tool, especially a rapid replacing structure for multi-purpose saw.

BACKGROUND OF INVENTION

As a frequently used hand-held oscillating power tool for the industry, multi-purpose saw incorporates a variety of operational features like sawing, cutting, grinding and scraping, etc. to address different operating requirements. At present, most multi-purpose saws available on the market are designed with press board and socket head cap screw for fixing a saw, which requires special tools to tighten or loosen the saw blades during replacement; such operation is complicated and time-consuming.

CONTENT OF INVENTION

In view of the existing problems in prior art, the present invention proposes a rapid replacing structure for multi-purpose saw to resolve the defects in blade replacement for the above-noted multi-purpose saw in prior art.

The technical solution of present invention is accomplished as follows:

The rapid replacing structure for multi-purpose saw includes an operating mechanism, a clamping mechanism and a collet; the collet is released or clamped by driving the clamping mechanism through the operating mechanism; the structure further including an output shaft having top and bottom openings and defining a chamber; wherein a lower end of the collet is fixedly mounted in the chamber on a bottom wall of the output shaft, a bore of the collet is oriented on a same axis as the bottom opening of the output shaft; the clamping mechanism includes a spring element disposed around an outer side of the collet, a collet sleeve, and a compressor arm; the collet sleeve is disposed around and movable along an upper portion of the collet, one end of the spring element is in contact with the bottom wall of the output shaft, while another end is in contact with the collet sleeve; the compressor arm includes a top lever, and a top ring integrally formed on a lower end of the top lever and located above the collet sleeve, the output shaft further includes an output shaft cover that is provided at the top opening of the output shaft and extended over the top ring of the compressor arm for limiting upward movement of the compressor arm; an upper end of the top lever of the compressor arm is connected in a contacted manner to the operating mechanism by extending upwardly through an opening of the output shaft cover; the operating mechanism pushes the compressor arm down to drive the collet sleeve to move downward, thereby releasing the upper portion of the collet; and a tension board is releasably arranged in the bore of the collet to fix a top-end tool.

Further, the operating mechanism comprises a cam and an operation handle; the cam is arranged above the compressor arm and connected with the operation handle.

Further, an inner wall of the top ring of the compressor arm is provided with a downwardly protruding truncated cone-shaped lug; when the compressor arm is depressed, the truncated cone-shaped lug is inserted into a top opening of collet, thereby opening the upper portion of collet.

Further, the collet includes a collet body provided with an alternate ring arrangement of a number of clamping pieces; an external contour of the collet body includes a first cylindrical section at a top of the collet body and a second cylindrical section at a bottom of the collet body; the first cylindrical section and second cylindrical section are subjected to necking connection.

Further, an inner wall of the upper portion of the collet is provided with a threaded clamping slot, the tension board is provided with an upper threaded end which is engageable in the threaded clamping slot.

Compared with prior arts, the present invention offers the following benefits:

The rapid replacing structure for multi-purpose saw proposed in the present invention depresses the compressor arm through an eccentric part of a cam so that the upper portion of the collet is opened while the collet sleeve moves downward; as a result, the tension board gets out of the collet, when the saw blade can be taken out; for re-installation, the resilience of a spring pushes the collet sleeve up, which drives the compressor arm up; when the compressor arm and collet get loosened, the collet returns to its original position, thereby clamping the tension board; the spring force enables the collet sleeve to drive the collet to hold the tension board and the saw blade for efficient replacement and easy operation of the operating tools.

DESCRIPTION OF DRAWINGS

To give a clearer description of the technical solutions in the embodiments of the present invention or the prior art, the drawings needed for the description of the embodiments or prior art are briefly presented below. Obviously, the drawings described below deal only with some embodiments of present invention. Ordinary skill in the art can obtain other drawings based on the drawings without making creative efforts.

SPECIFIC EMBODIMENTS

The drawings in embodiments of the present invention are used to give a clearer and more complete description of the technical solutions in embodiments of the present invention. It is obvious that the described embodiments are just part of the embodiments of the present invention. Based on embodiments of the present invention, every other embodiment achieved by the one of ordinary skill in the art without creative efforts is deemed within the protection scope of the present invention.

Figure 1:
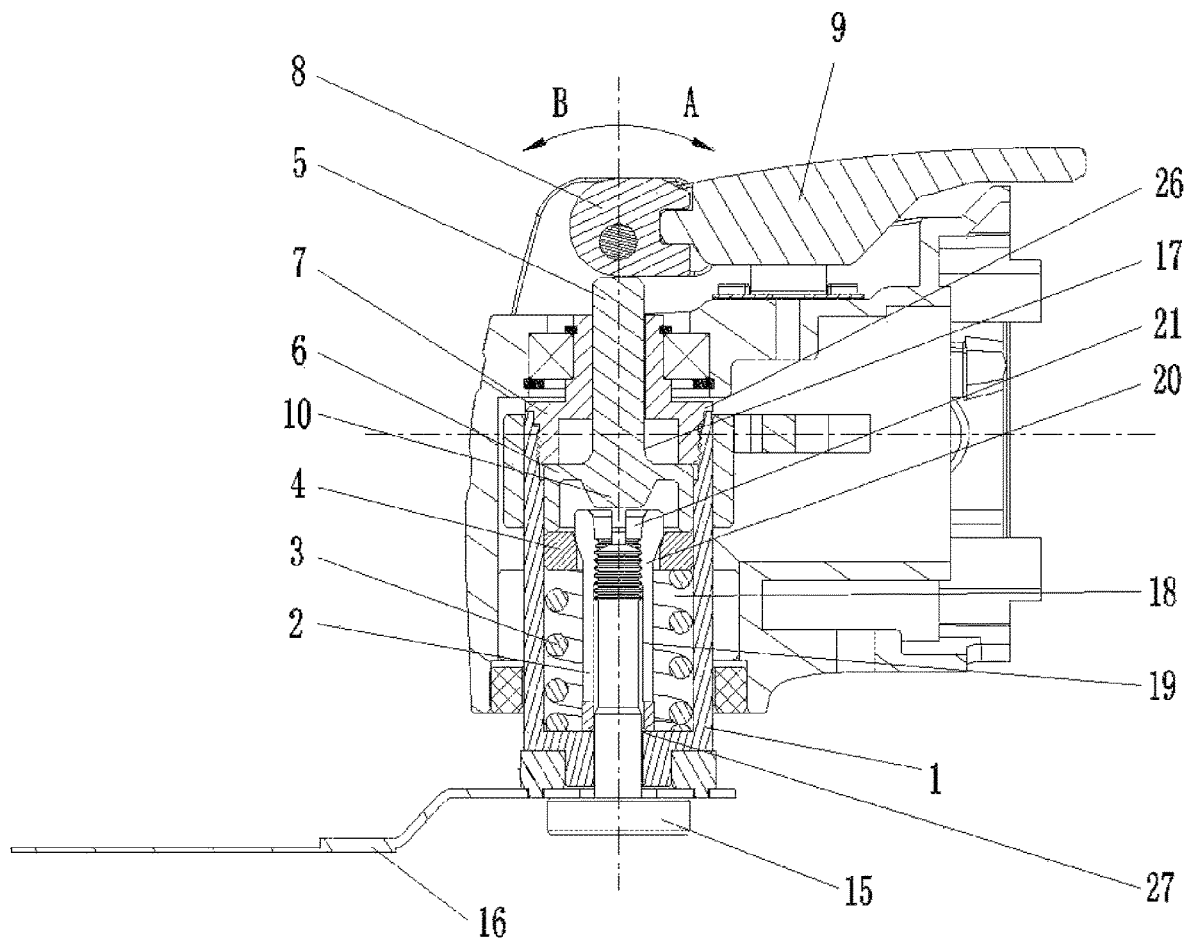
FIG. 1 is the structural diagram of the rapid replacing structure for multi-purpose saw proposed in the present invention in a locked state.
Figure 3:
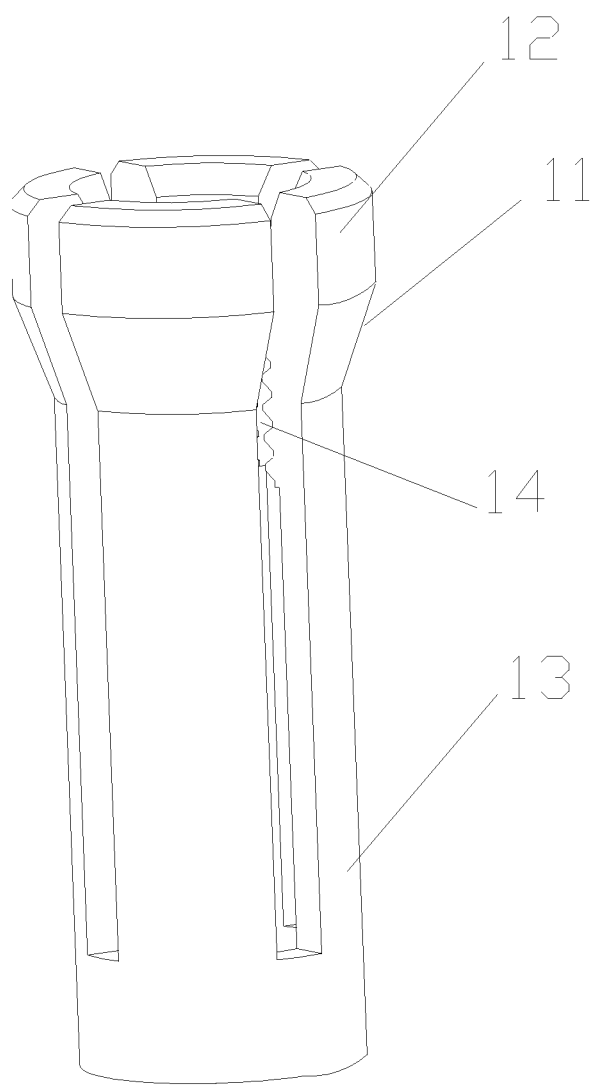
FIG. 3 is the structural diagram of the collet shown in FIG. 1.

As shown in FIG. 1, the rapid replacing structure for multi-purpose saw includes an operating mechanism, a clamping mechanism and a collet; the collet is released or clamped by driving the clamping mechanism through the operating mechanism; in addition, the structure also includes an output shaft 1 having top and bottom openings 26, 27 and defining a chamber 18; the collet 2 is placed in the chamber, where a bore 19 of collet is oriented on the same axis as the bottom opening of the output shaft; the clamping mechanism includes a spring element 3 that is disposed around an outer side of the collet, a collet sleeve 4 and a compressor arm 17; the collet sleeve is disposed around and movable along an upper portion 20 of the collet, one end of the spring element 3 is in contact with the bottom wall of the chamber, while another end is in contact with the collet sleeve 4; the tension board 15 includes a top lever 5, and a top ring 6 integrally formed on a lower end of the top lever and located above the collet sleeve, the output shaft 1 further includes an output shaft cover 7 that is provided at the top opening of the output shaft 1 and extended over the top ring 6 of the compressor arm for limiting upward movement of the compressor arm; an upper end of the top lever of the compressor arm is connected in a contacted manner to the operating mechanism by extending through an opening of the output shaft cover 7; the operating mechanism pushes the compressor arm down to drive the collet sleeve 4 to move downward, thereby releasing the upper portion of the said collet; in addition, a tension board 15 is releasably arranged in the bore of the collet to fix a top-end tool 16; the operating mechanism includes a cam 8 and an operation handle 9; the cam is arranged above the compressor arm and connected with the operation handle 9; the inner wall of the compressor arm top ring 6 is designed with a downwardly protruding truncated cone-shaped lug 10; when the compressor arm is depressed, the truncated cone-shaped lug is inserted into a top opening 21 of the collet, thereby opening the upper portion 20 of the collet; as shown in FIG. 3, the collet includes a collet body provided with an alternate ring arrangement of a number of clamping pieces 11; the external contour of the collet body includes a first cylindrical section 12 at the top and a second cylindrical section 13 at the bottom; the first cylindrical section and second cylindrical section are subjected to necking connection; the inner wall of the collet is designed with a threaded clamping slot 14, the tension board is provided with an upper threaded end 23 which is engageable in the threaded clamping slot 14.

Figure 2:
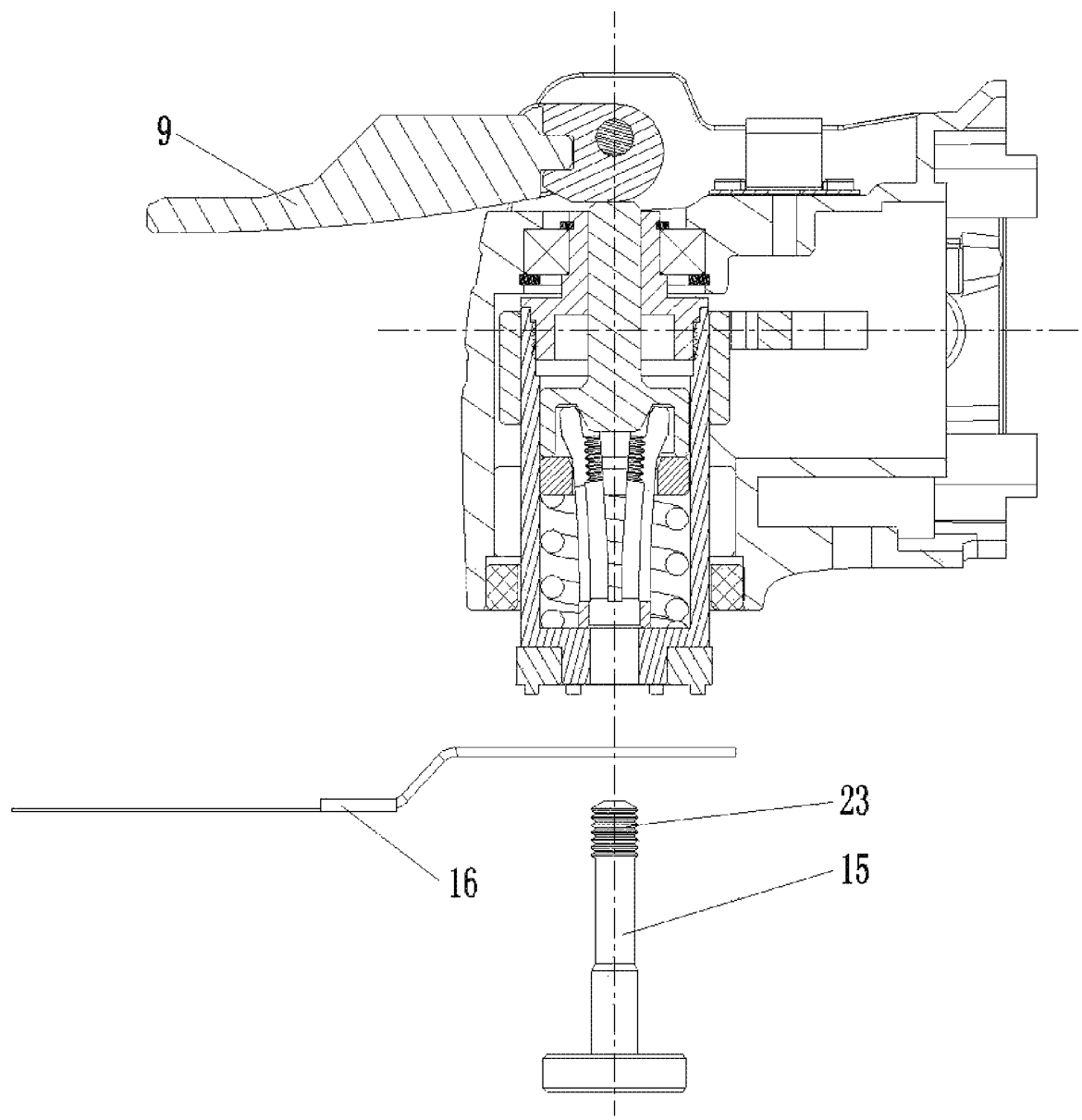
FIG. 2 is the structural diagram of the rapid replacing structure for multi-purpose saw proposed in the present invention in an unlocked state.

FIG. 1 shows the locked state of a saw blade. When the wrench is turned from position A to B, as shown in FIG. 2, the rapid replacing structure for multi-purpose saw proposed in the present invention depresses the compressor arm through the eccentric part of the cam so that the upper portion of the collet is opened while the collet sleeve moves downward; as a result, the tension board gets out of the collet, when the saw blade can be taken out; for re-installation, the resilience of the spring pushes the collet sleeve up, which drives the compressor arm up; when the compressor arm and collet get loosened, the collet returns to its original position, thereby clamping the tension board; the spring force enables the collet sleeve to drive the collet to hold the tension board and saw blade.

The above are merely preferred embodiments of the present invention, thus not being used to restrict the present invention. Any modification, equivalent replacement and improvement, etc. performed following the principles of the present invention shall be covered by the protection of the present invention.

What is claimed is:

1. A rapid replacing structure for multi-purpose saw, comprising:
   an operating mechanism, a clamping mechanism and a collet; the collet is released or clamped by driving the clamping mechanism through the operating mechanism; the structure further comprising an output shaft having top and bottom openings and defining a chamber;
   wherein a lower end of the collet is fixedly mounted in the chamber on a bottom wall of the output shaft, a bore of the collet is oriented on a same axis as the bottom opening of the output shaft;
   the clamping mechanism comprises a spring element disposed around an outer side of the collet, a collet sleeve, and a compressor arm; the collet sleeve is disposed around the collet and above the spring element, and is movable relative to the collet along a longitudinal axis of the collet, one end of the spring element is in contact with the bottom wall of the output shaft, while another end is in contact with the collet sleeve;
   the compressor arm comprises a top lever, and a top ring integrally formed on a lower end of the top lever and located above the collet sleeve, the top ring abutting against the collet sleeve, the output shaft further comprises an output shaft cover that is provided at the top opening of the output shaft and extended over the top ring of the compressor arm for limiting upward movement of the compressor arm; an upper end of the top lever of the compressor arm is connected in a contacted manner to the operating mechanism by extending upwardly through an opening of the output shaft cover;
   the operating mechanism pushes the compressor arm down to drive the collet sleeve to move downward, thereby releasing the upper portion of the collet; and a tension board is releasably arranged in the bore of the collet to fix a top-end tool.

2. The rapid replacing structure for multi-purpose saw according to claim 1, wherein the operating mechanism comprises a cam and an operation handle; the cam is arranged above the compressor arm and connected with the operation handle.

3. The rapid replacing structure for multi-purpose saw according to claim 1, wherein an inner wall of the top ring of the compressor arm is provided with a downwardly protruding truncated cone-shaped lug; when the compressor arm is depressed, the truncated cone-shaped lug is inserted into a top opening of the collet, thereby opening the upper portion of the collet.

4. The rapid replacing structure for multi-purpose saw according to claim 1, wherein the collet comprises a collet body provided with an alternate ring arrangement of a number of clamping pieces; an external contour of the collet body includes a first cylindrical section at a top of the collet body and a second cylindrical section at a bottom of the collet body; the first cylindrical section and second cylindrical section are subjected to necking connection.

5. The rapid replacing structure for multi-purpose saw according to claim 1, wherein an inner wall of the upper portion of the collet is provided with a threaded clamping slot, the tension board is provided with an upper threaded end which is engageable in the threaded clamping slot.

* * * * *